O. A. COLBY.
CONTROL APPARATUS.
APPLICATION FILED MAR. 21, 1914.

1,246,394.

Patented Nov. 13, 1917.
2 SHEETS—SHEET 1.

WITNESSES:
C. A. Mayfield
D. W. Mace

INVENTOR
Ora A. Colby
BY
Wesley G. Carr
ATTORNEY

O. A. COLBY.
CONTROL APPARATUS.
APPLICATION FILED MAR. 21, 1914.
1,246,394.
Patented Nov. 13, 1917.
2 SHEETS—SHEET 2.
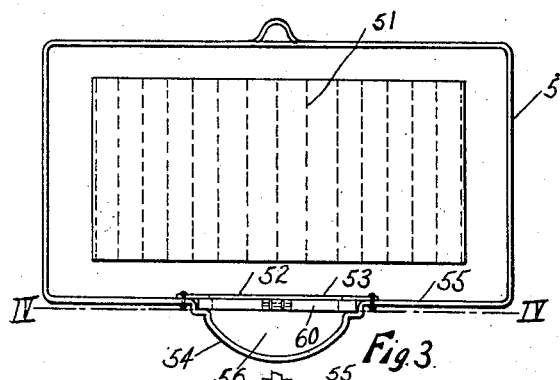
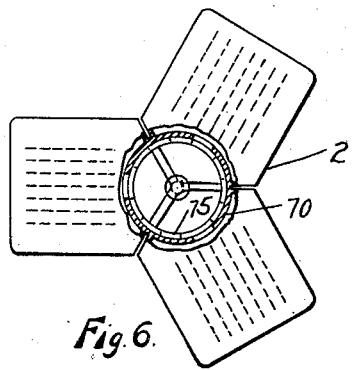
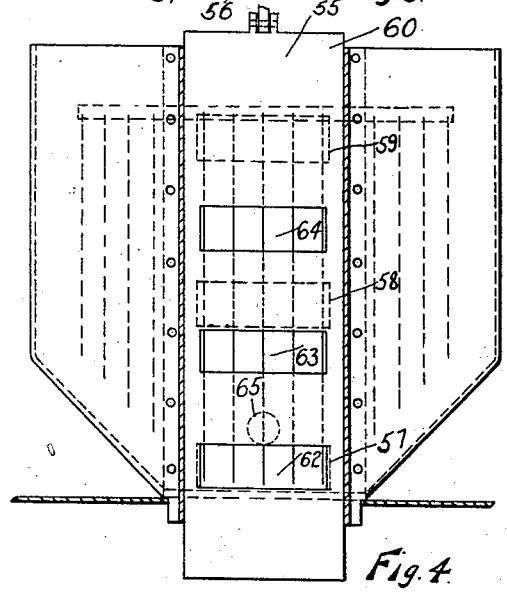
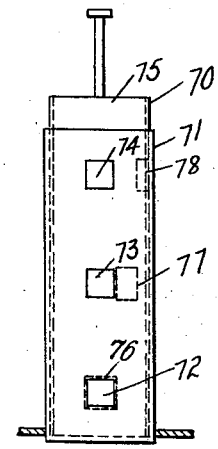
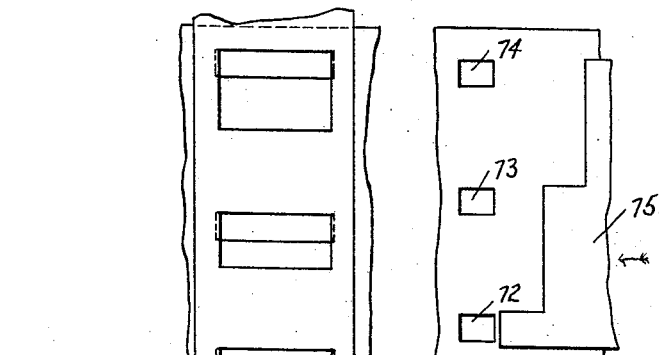
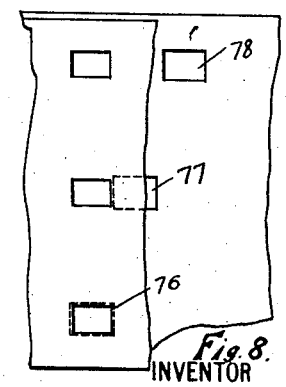
WITNESSES
C. A. Mayfield
D. H. Mace
INVENTOR
Ora A. Colby
BY
Wesley G. Carr
ATTORNEY

UNITED STATES PATENT OFFICE.

ORA A. COLBY, OF WILKINSBURG, PENNSYLVANIA, ASSIGNOR TO WESTINGHOUSE ELECTRIC AND MANUFACTURING COMPANY, A CORPORATION OF PENNSYLVANIA.

CONTROL APPARATUS.

1,246,394.    Specification of Letters Patent.    Patented Nov. 13, 1917.

Application filed March 21, 1914. Serial No. 826,375.

*To all whom it may concern:*

Be it known that I, ORA A. COLBY, a citizen of the United States, and a resident of Wilkinsburg, in the county of Allegheny and State of Pennsylvania, have invented a new and useful Improvement in Control Apparatus, of which the following is a specification.

My invention relates to control apparatus and it has special reference to liquid rheostats.

The object of my invention is to provide simple and effective means for governing the operation of devices of the above-indicated class, and particularly, to provide controllable means for definitely fixing the height of the electrolyte contained within the rheostat tank.

More specifically, the object of my invention is to provide a liquid rheostat embodying a valve member provided with a plurality of vertically spaced openings through which the electrolyte may flow, and to provide means for controlling said openings in a predetermined sequence.

Figure 1:
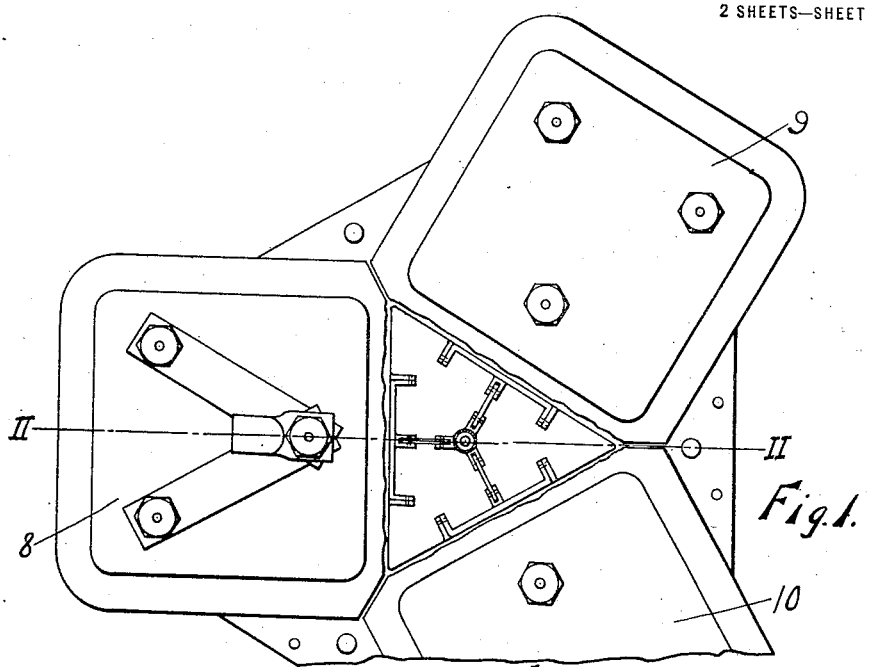
Figure 2:
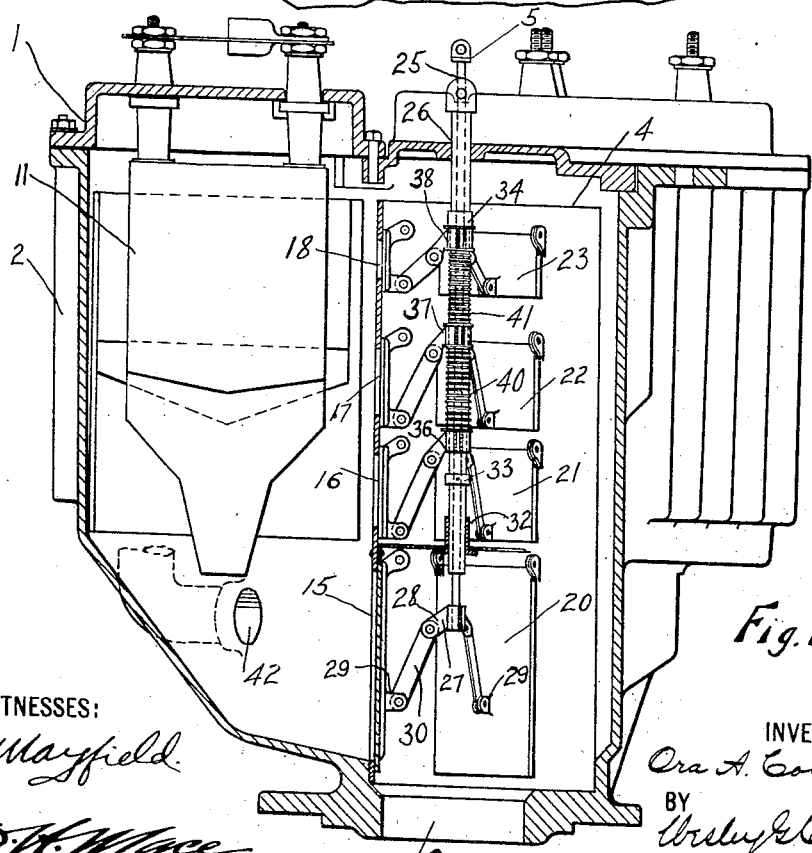

In the accompanying drawings, Figure 1 is a plan view of a portion of a device constructed in accordance with my invention, a portion of the apparatus being broken away for the sake of clearness. Fig. 2 is a view, partially in section and partially in elevation, of the apparatus shown in Fig. 1, the section being taken along the line II—II of Fig. 1. Figs. 3 and 4 are, respectively, a plan view and a view, partially in section and partially in elevation, of a modified form of my invention, the section being taken also on the line IV—IV of Fig. 3. Fig. 5 is a view, in elevation, of a portion of a slightly modified valve adapted for use in connection with the rheostat shown in Figs. 3 and 4. Fig. 6 is a plan view of another modified form of my invention. Fig. 7 is a view, in elevation of the valve shown in Fig. 6, and Figs. 8 and 9 are, respectively, developments of the valve shown in Fig. 7, and of a slightly modified type of valve.

Referring to Figs. 1 and 2 of the drawings, a liquid rheostat 1 comprises a containing tank 2 having a bottom opening 3, a hollow stationary valve member 4 communicating with said opening 3 and projecting upwardly into the tank 2, and an operating mechanism 5 for controlling the operation of the rheostat.

The tank 1, as shown, embodies a plurality of compartments 8, 9 and 10, each of which contains a set of coöperating electrodes 11. The stationary member 4 is triangular in form and is provided with a plurality of sets of vertically spaced openings 15, 16, 17 and 18, which communicate with the several adjacent compartments for the purpose of fixing the level of the electrolyte within the tank and for disposing of the excess thereof which is carried away through the hollow member 4 and discharge opening 3. A plurality of pivotally mounted members or valves 20, 21, 22 and 23 coöperate with each side of the triangular hollow member 4, and are adapted to severally open or close the respective openings 15, 16, 17 and 18 thereof.

Centrally disposed within the hollow member 4 is the operating mechanism 5 which embodies a plurality of operating rods 25 and 26 which are concentrically related. The lower end of the inner rod 25 is provided with a member 27 having a plurality of outwardly projecting arms 28 which are respectively connected to lugs or clips 29 on the adjacent pivotally mounted members 20 by means of links 30.

The rod 26 is slidably mounted within a guide member 32 and is provided with fixed collars 33 and 34. Between the collars 33 and 34 are a plurality of members 36, 37 and 38 of similar structure to the member 27 hereinbefore described, but which loosely engage the rod 26 and are adapted for relative vertical movement with respect thereto. The several members 36, 37 and 38 are respectively connected to the movable members 21, 22 and 23 by links 30 in the manner already described.

Furthermore, a plurality of coil springs 40 and 41 surround the rod 26 and are interposed between the several sliding members 36, 37 and 38. The operating rods 25 and 26 project outside of the tank 2 and may be actuated by any suitable means, such for instance, as an electrically controlled pneumatic device, or the like.

Assuming the parts of the apparatus to occupy the positions shown in Figs. 1 and 2 and the tank 2 to be filled with electrolyte to the level of the upper end of the hollow valve member 4, the operation of the apparatus is as follows: If it is desired to quickly discharge the electrolyte, the operating rod 25 is first raised, thereby causing the several movable members 20 which normally close the lowest openings 15 to swing inwardly. Thus, the electrolyte is discharged through the openings 15 and the bottom tank opening 3. In order to increase the rapidity of the discharge operation, the operating rod 26 may be raised, thereby raising the members 23, 22 and 21 in the order named. This action will be evident from the following explanation: In the illustrated closed position of the valves, the several springs are under compression. Consequently, when the rod 26 is raised, the expanding spring 41 tends to hold the sliding member 38 in contact with the fixed collar 34, whereby the relatively increased external pressure of the liquid upon the valves 23 opens them. Thereupon the spring pressure against the sliding member 37 is relieved and the valves 22 are opened. Finally, stop member 33 engages the sliding member 36 and the opening of the valves 21 is thus effected. However, ordinarily this action will not be necessary as the size of the openings 15 is chosen to effect the discharge of the electrolyte at the desired rate.

Assuming all of the ports 15, 16, 17 and 18 to be open, and electrolyte to be flowing through the rheostat from inlet 42, the rheostat is filled with electrolyte as follows: The operating rod 25 is first forced downwardly, thereby effecting the closure of the movable members 20, which cause the inflowing electrolyte to rise within the tank 2 to a level corresponding to the openings 16 which are located slightly above the lower ends of the electrodes. Thus, the electric circuit is completed and the level of the electrolyte is maintained at the height of the overflow openings 16 until further operation of the operating mechanism 5. In order to raise the level of the electrolyte, the operating rod 26 is moved downwardly a sufficient amount to partially compress the springs 40 and 41 and cause the movable members 21 to close the openings 16. Further movement of the operating rod 26 in a downward direction causes the movable members 22 and 23 to close the overflow openings 17 and 18 in succession, whereby the electrolyte level may be fixed at corresponding heights, or may be raised by steps to the height of the upper end of the hollow member 4.

By reason of the arrangement and location of parts of the operating mechanism which serves to actuate the movable members 21, 22 and 23, these members are closed in a predetermined sequence with a relatively short movement of the operating rod 26, while permitting a considerable range of adjustment of the several movable members 21, 22 and 23.

Reference may now be had to Figs. 3 and 4 in which a tank 50 having a plurality of sets of electrodes 51 disposed therein, is provided with an adjustable valve device 52 for fixing the level of the electrolyte. One side 53 of the tank 50 is provided with an enlarged portion 54, and a stationary member or partition 55 is fastened to the side 53 of the tank for providing a chamber 56 which constitutes the overflow or discharge passage. The member 55 is provided with a plurality of openings 57, 58 and 59 which are spaced the one above the other. Coöperating with the stationary member 55 is a movable member 60 which is adapted for relative vertical movement with respect to the stationary member 55 and is provided with a plurality of openings 62, 63, and 64 to successively register with the openings 57, 58 and 59 of the movable member 55 to provide overflow outlets at different heights.

If the parts of apparatus occupy the positions shown in Figs. 3 and 4 and electrolyte is admitted into the tank through an inlet port 65, the electrolyte merely flows through the tank, being discharged through the registering openings 57 and 62 and the discharge chamber 56. If, however, the movable member 60 is raised slightly, the lowest opening 57 is closed, and the next higher opening 58 is opened by registering with the opening 63. The electrolyte then fills the tank to a height corresponding to the registered openings 58 and 63, where the level is maintained. Further movement of the member 60 maintains the opening 57 closed and effects the closure of the opening 58, while the openings 59 and 64 are caused to register to permit of the overflow of electrolyte when a level corresponding to that of the said registering openings is reached.

In this form of my invention, only a single overflow opening is uncovered at a time, while in Fig. 5 I have shown a device in which all of the overflow outlets are normally open, and are closed successively.

Referring now to Figs. 6 and 7, a containing tank 2, similar to that set forth in Figs. 1 and 2, is provided with a centrally disposed regulatable valve device 70 which is tubular in form and comprises a stationary outer tubular member 71 having a plurality of sets of vertically spaced openings 72, 73 and 74 with which an inner tubular member 75 coöperates. The inner member 75 is rotatable with respect to the outer member 71 and is provided with a plurality of sets of spaced openings 76, 77 and 78 which are adapted to register the openings 72, 73 and 74 successively to provide overflow outlets for determining the height of the electrolyte within the tank 2.

In Fig. 8, a development of a portion of the relatively movable valve members 71 and 75 is shown for the purpose of more clearly setting forth the relation of parts.

In Fig. 9, the openings 72, 73 and 74 are adapted to be closed successively by the movement of coöperating member 75ª which instead of being provided with a series of openings, as just described, is of notched configuration and adapted to close the openings 72, 73 and 74, in the order named, when moved in the direction of the arrow.

These, and other modifications which do not depart from the spirit and scope of my invention are intended to be covered by the appended claims.

I claim as my invention:

1. The combination with a liquid-containing tank having an opening therein, and a tubular member communicating with said opening and projecting upwardly into said tank and having a plurality of vertically spaced apertures therein, of plural controllable mechanical means for successively closing said apertures.

2. The combination with a liquid-containing tank, a stationary member associated therewith having a plurality of vertically disposed openings, of plural movable mechanical means adapted to severally coöperate with said stationary member for opening and closing said apertures in a predetermined sequence.

3. The combination with a liquid-containing tank having a centrally disposed bottom opening, and a tubular member communicating with said opening and projecting upwardly into said tank and having vertically disposed sets of coöperating apertures, of a plurality of relatively movable mechanical means for concurrently closing the apertures comprising the respective sets.

4. The combination with a liquid-containing tank, a stationary member associated therewith having a plurality of vertically disposed openings, of a plurality of movable members severally adapted to control the openings in said stationary member, and mechanical means, independent of the liquid level for successively actuating said movable members.

5. The combination with a liquid-containing tank, a stationary member associated therewith having a plurality of vertically disposed openings, of a plurality of pivotally mounted members adapted to close said openings, and mechanical means dependent upon extraneous conditions for actuating said members in a predetermined sequence.

6. The combination with a liquid-containing tank having a bottom opening therein, and a tubular member associated with said opening and projecting into said tank and having a plurality of vertically-spaced openings, of a plurality of relatively movable means disposed within said tubular member for successively closing said openings.

7. The combination with a liquid-containing tank having a bottom opening therein, and a hollow member associated with said opening and projecting into said tank and having a plurality of vertically spaced openings, of a plurality of movable members disposed within said hollow member and severally adapted to coöperate with said member to close said openings, and means disposed within said hollow member for actuating said movable members in a predetermined sequence.

8. The combination with a liquid-containing tank having a bottom opening therein, and a hollow member associated with said opening and projecting into said tank and having a plurality of vertically spaced openings, of a plurality of movable members respectively adapted to close the openings in said stationary member, means for actuating a portion of said movable members to close their corresponding openings successively, and independent means for actuating one of said movable members.

9. The combination with a liquid-containing tank having a bottom opening therein, and a hollow member associated with said opening and projecting into said tank and having a plurality of vertically spaced openings, of a plurality of movable members for closing the respective openings in said stationary member, means for actuating the lowest movable member, and independent means for successively actuating the other movable members.

10. The combination with a liquid-containing tank having a plurality of compartments and a bottom opening, and a centrally disposed hollow member communicating with said bottom opening and projecting upwardly into said tank and having a plurality of sets of vertically disposed openings, of means for concurrently closing the correspondingly located openings.

11. The combination with a liquid-containing tank having a plurality of compartments and a bottom opening, and a centrally disposed hollow member communicating with said bottom opening and projecting upwardly into said tank and having a plurality of sets of vertically disposed openings, of movable means coöperating with said hollow member for concurrently closing the correspondingly located openings in a predetermined sequence.

12. The combination with a liquid-containing tank having a plurality of compartments and a central bottom opening, and a tubular member communicating with said opening and projecting upwardly in the middle of said tank and having a plurality of vertically disposed sets of apertures that respectively communicate with the several compartments, of plural means associated with said tubular member for controlling the opening and closure of said apertures.

13. The combination with a liquid-containing multi-compartment tank having a centrally disposed bottom opening, of a tubular member communicating with said opening and having a plurality of sets of apertures that respectively communicate with the several compartments, and means for concurrently closing the apertures comprising any set.

14. The combination with a liquid-containing multi-compartment tank having a centrally disposed bottom opening, of a tubular member communicating with said opening and having a plurality of sets of apertures that respectively communicate with the several compartments, means for concurrently closing the apertures comprising any set, and means for successively closing the sets of apertures.

In testimony whereof, I have hereunto subscribed my name this 13th day of March, 1914.

ORA A. COLBY.

Witnesses:
C. AATBORG,
B. B. HINES.

Copies of this patent may be obtained for five cents each, by addressing the "Commissioner of Patents, Washington, D. C."